United States Patent
Shu-Ming

(10) Patent No.: US 6,597,453 B1
(45) Date of Patent: *Jul. 22, 2003

(54) COMPUTER JOYSTICK

(75) Inventor: Liu Shu-Ming, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/143,451

(22) Filed: Aug. 28, 1998

(30) Foreign Application Priority Data

Jul. 3, 1998 (TW) .......................................... 871108-1

(51) Int. Cl.$^7$ ................................................. G01B 9/08
(52) U.S. Cl. ........................ 356/392; 356/364; 356/373; 356/385
(58) Field of Search ................................ 356/392, 364, 356/373, 385

(56) References Cited

U.S. PATENT DOCUMENTS 5,486,925 A * 1/1996 Sano et al. .................. 356/385
5,585,924 A * 12/1996 Schneider et al. .......... 356/385

* cited by examiner

Primary Examiner—Frank G. Font
Assistant Examiner—Reginald A. Ratliff
(74) Attorney, Agent, or Firm—Winston Hsu

(57) ABSTRACT

The present invention provides a computer joystick which will convert movements of its control stick into digital signals. The computer joystick comprises a housing with an opening on its top, a control stick, and two optical sensing devices for detecting movements of the control stick in two perpendicular directions and generating corresponding displacement signals. The control stick comprises a handle installed at its top section, a ball-shaped portion installed at its middle section, and a driving mechanism installed at its bottom section. Each of the optical sensing devices comprises an optical panel comprising a plurality of light transmitting holes installed on it, a light source and a plurality of optic sensors installed at opposite sides of the optical panel, and a plurality of comparators for comparing detecting signals generated by the optic sensors so as to generate the displacement signals. When the handle of the control stick is moved, the driving mechanism of the control stick will rotate the optical panel so as to move the light transmitting holes on it, the comparators will then compare the detecting signals generated by the optic sensors based on movements of the light transmitting holes so as to generate a corresponding displacement signal.

5 Claims, 5 Drawing Sheets

COMPUTER JOYSTICK

BACKGROUND OF THE INVENTION

1. Field of the Invention

The present invention relates to a computer joystick, more particularly, to a computer joystick for detecting and converting displacements of its control stick into digital signals.

2. Description of the Prior Art

Computer joysticks are widely used in computer games for controlling movements of a cursor or object on a screen. A typical computer joystick comprises a housing for installing electronic and mechanical components, a vertical control stick rotatable within a fixed angle for controlling movements of the cursor on the screen, and two optical sensing devices installed at the bottom of the control stick for detecting the displacement of the control stick in different directions and converting the displacement into a corresponding displacement signal.

Please refer to FIGS. 1 and 2. FIG. 1 is a perspective view of a prior art optical sensing device 10. FIG. 2 shows a process of adjusting a detecting signal generated by the optical sensing device 10. The optical sensing device 10 comprises a circular shaped optical panel 11 comprising a plurality of light transmitting holes 12 installed around the periphery of the optical panel 11, a light source 14 installed at one side of the optical panel 11, and an optic sensor 16 installed at another side of the optical panel 11 for detecting rotations of the optical panel 11 relative to the optic sensor 16. When the optic sensor 16 receives light transmitted from the light source 14, it will generate an analog signal 18 with different amplitudes depending on the intensity of the received light. The analog signal 18 will then be converted into a digital signal 24 based on an upper limit voltage 20 and a lower limit voltage 22. As shown in FIG. 2, the upper limit voltage 20 is set at 3V, and the lower limit voltage 22 is set at 1V. The potential of the analog signal 18 exceeding 3V is defined as "1", and the potential of that below 1V is defined as "0". Such an arrangement will convert the peaks of the analog signal 18 into "1" as shown in the digital signal 24, and the troughs into "0". These digital numbers are used for representing rotations of the computer joystick.

However, the aforementioned analog/digital converting method has a number of drawbacks. First, because the generation of each digital signal 24 is triggered when the voltage of the analog signal 18 reaches the upper or lower limit voltage 20, 24, and the rise and fall of the analog signal 18 from one voltage to another requires a finite amount of time, it generally takes roughly 90~120 μs of time to make a change in the digital signal 24 thus making the optical sensing device 10 very unresponsive. Second, as shown in a dotted portion 26 of FIG. 2, if the computer joystick is rotated before the analog signal 26 hits the upper or lower limit voltage 20, 22, a corresponding digital signal will not be generated therefore causing the computer joystick to miss a count.

SUMMARY OF THE INVENTION

It is therefore a primary objective of the present invention to provide a computer joystick to solve the above mentioned problems.

Briefly, in a preferred embodiment, the present invention provides a computer joystick comprising:

a housing having an opening on its top;

a control stick comprising a handle installed at its top section, a ball-shaped portion at its middle section rotatably installed inside the opening of the housing, and a driving mechanism installed at its bottom section; and two optical sensing devices for detecting movements of the driving mechanism of the control stick in two perpendicular directions and generating corresponding displacement signals, each optical sensing device comprising:

an optical panel comprising a plurality of light transmitting holes installed on it;

a light source installed at one side of the optical panel;

a plurality of sequentially arranged optic sensors installed at another side of the optical panel for detecting light transmitted from the light source through the light transmitting holes of the optical panel and generating correspondent detecting signals; and a plurality of comparators for comparing the detecting signals to generate the displacement signals;

wherein when the handle at the top section of the control stick is moved, the driving mechanism at the bottom section of the control stick will rotate the optical panel so as to move the light transmitting holes on it, and the comparators will then compare the detecting signals generated by the optic sensors when the light transmitting holes are moved so as to generate the corresponding displacement signals.

It is an advantage of the present invention that the comparators of the computer joystick output logic high signals and logic low signals whenever the handle of the control stick moves no matter how small the movement is. Therefore, the computer joystick is very sensitive and responsive to movements of the control stick, and will not miss a count.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
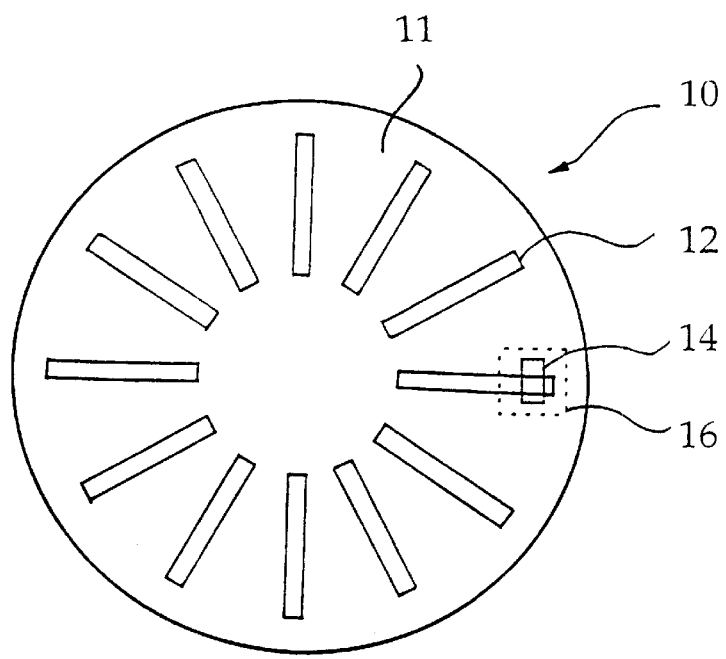
FIG. 1 is a perspective view of a prior art optical sensing device.
Figure 2:
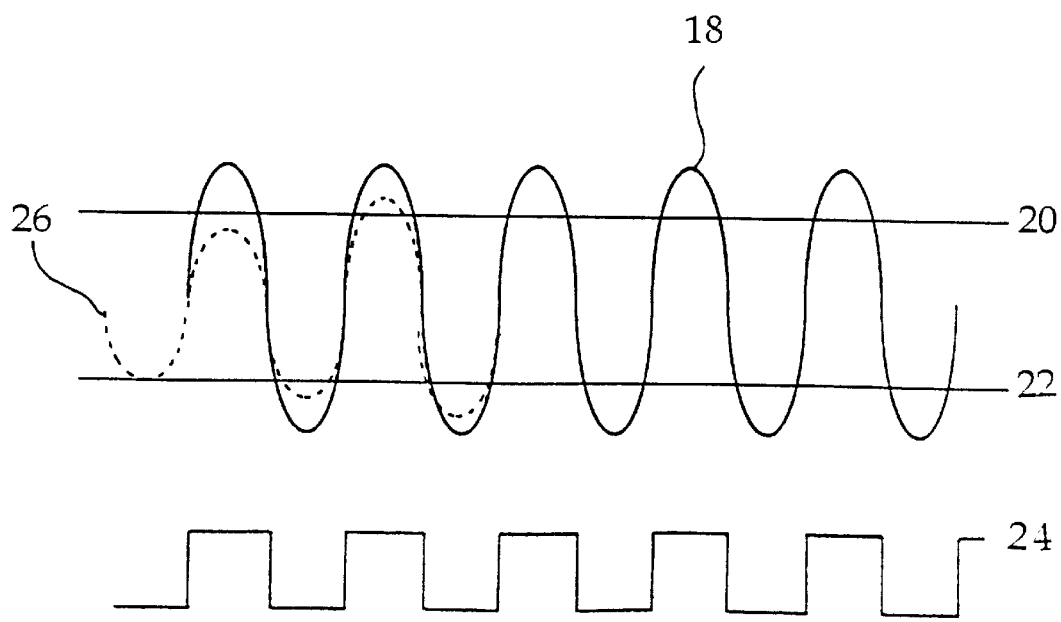
FIG. 2 shows a process of adjusting a detecting signal generated by the optical sensing device in FIG. 1.
Figure 3:
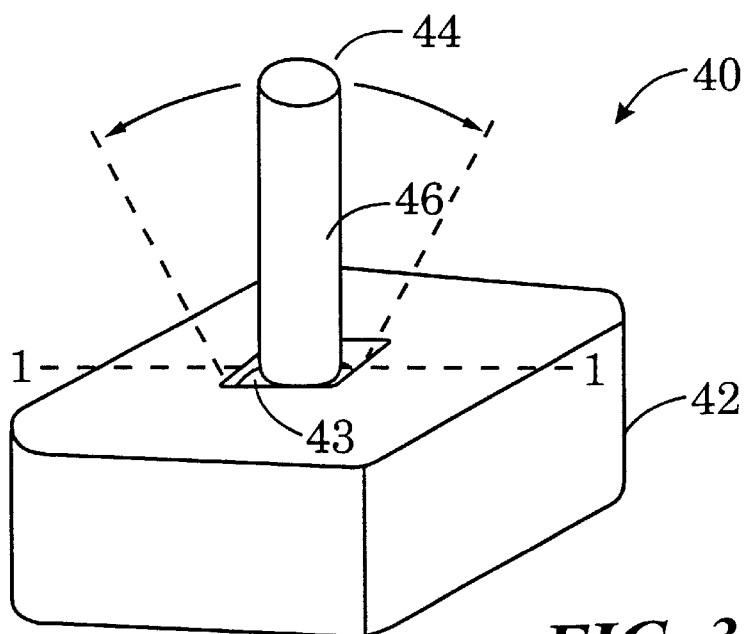
FIG. 3 is a perspective view of a computer joystick according to the present invention.
Figure 4:
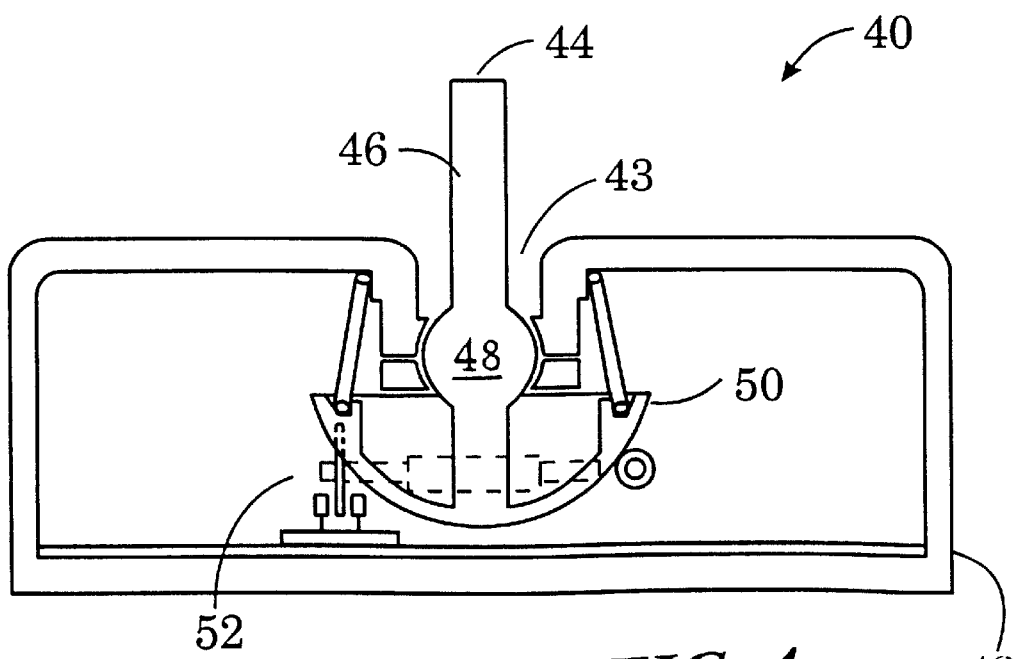
FIG. 4 is a sectional view along line 1—1 of the computer joystick in FIG. 3.

Please refer to FIGS. 3 and 4. FIG. 3 is a perspective view of a computer joystick 40 according to the present invention. FIG. 4 is a sectional view along line 1—1 of the computer joystick 40. The computer joystick 40 comprises a housing 42 with an opening 43 on its top, and a control stick 44 moveable within a fixed angle. The control stick 44 comprises a handle 46 installed at its top section protruding from the opening 43, a ball-shaped portion 48 at its middle section rotatably installed in the opening 43 of the housing 42, and a semi-spherical driving mechanism 50 installed at its bottom section. The computer joystick 40 further comprises two optical sensing devices 52 (only one is shown in FIG. 4) for detecting displacements of the driving mechanism 50 in two mutually perpendicular directions and generating corresponding signals, and a processor 51 for generating displacement signals according to the signals generated by the optical sensing devices 52.

Figure 5:
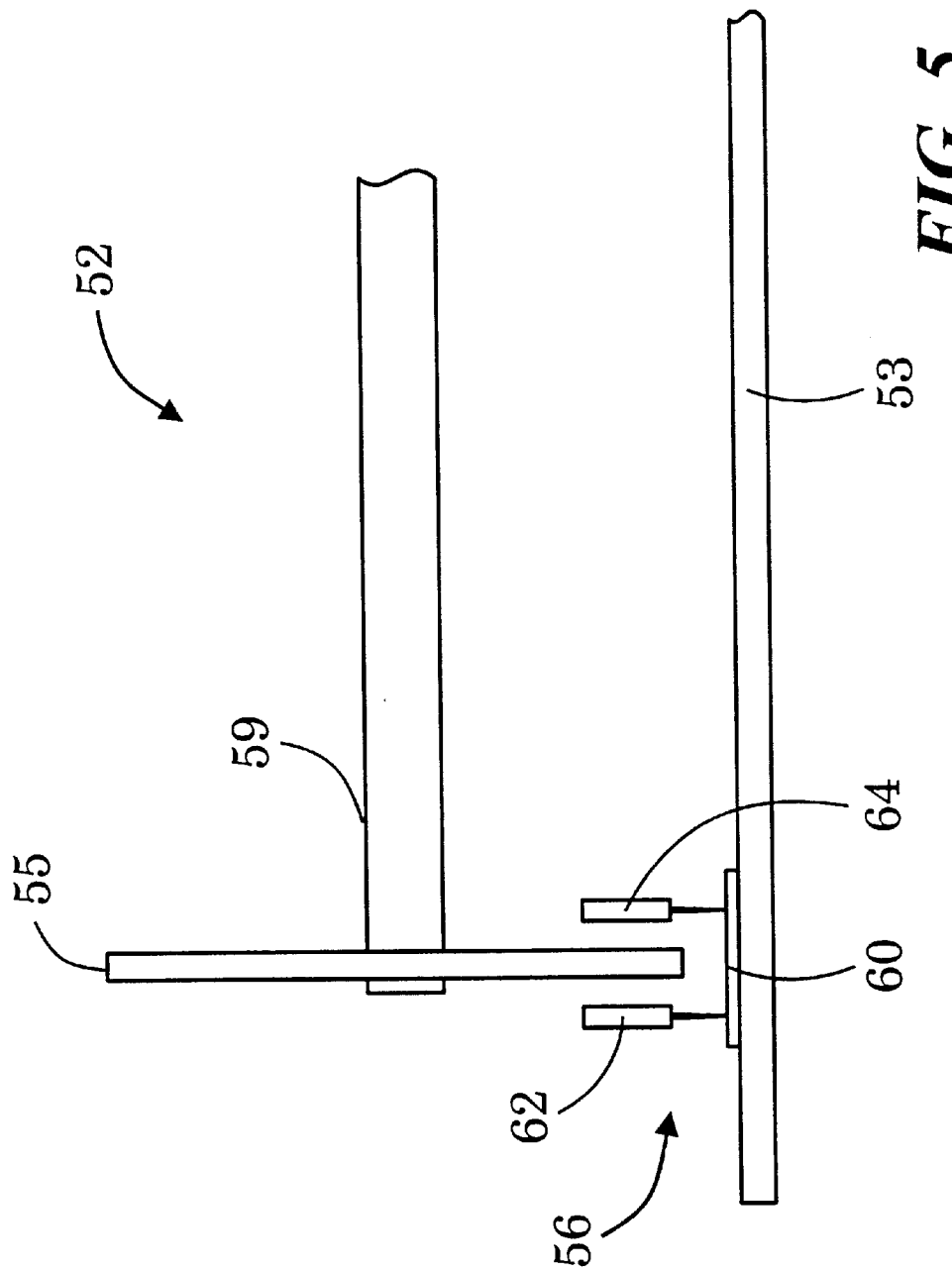
FIG. 5 is a side view of the optical sensing device in FIG. 4.
Figure 6:
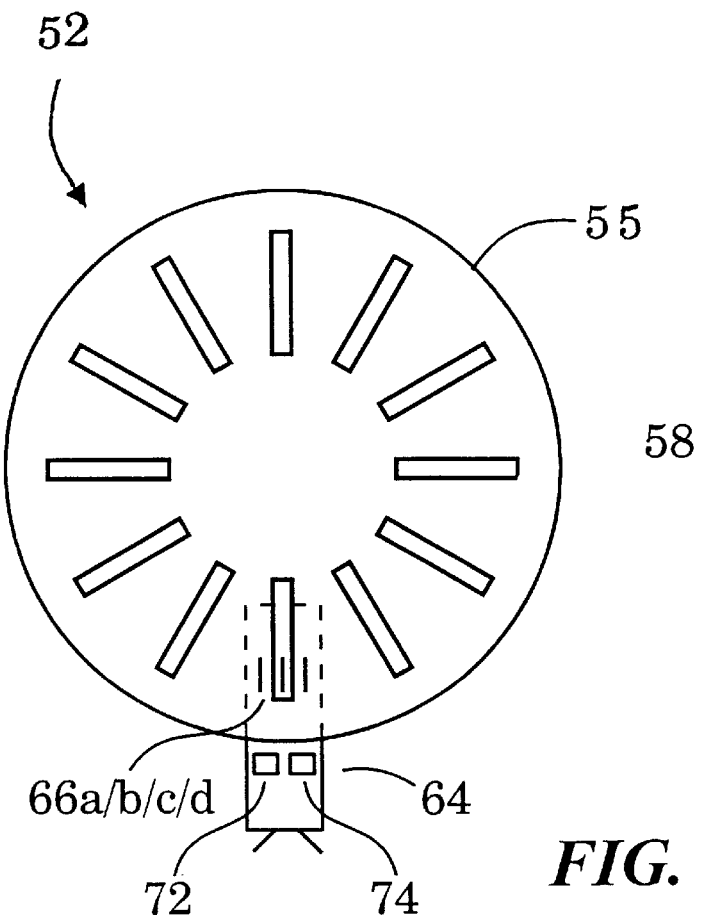
FIG. 6 is a front view of the optical sensing device in FIG. 4.
Figure 7:
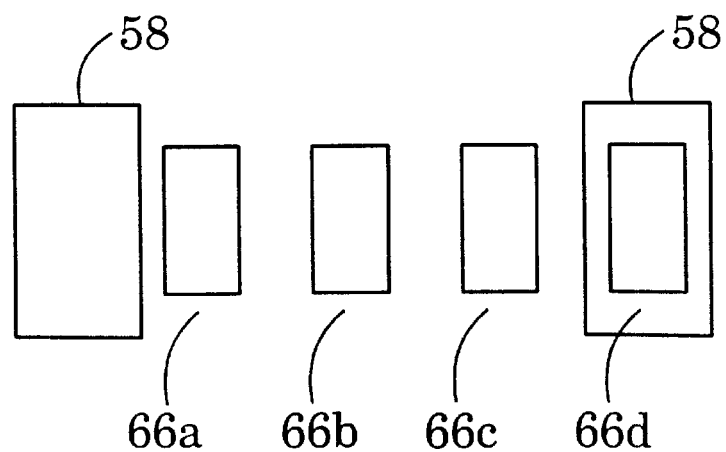
FIG. 7 is a perspective view of the light transmitting holes shown in FIG. 6 passing by the optic sensors.

Please refer to FIGS. 5 to 7. FIG. 5 is a side view of the optical sensing device 52 in FIG. 4. FIG. 6 is a front view of the optical sensing device 52. FIG. 7 is a perspective view of light transmitting holes 58 passing by optic sensors 66a, 66b, 66c, 66d. The optical sensing device 52 comprises a chassis 53, a circular shaped optical panel 55 rotatably installed on the chassis 53, an axle 59 installed at a center of the optical panel 55 for rotating with the semi-spherical surface of the driving mechanism 50 at the bottom section of the control stick 44 and rotating the optical panel 55, and a detecting device 56 installed on the chassis 53 for detecting rotations of the optical panel 55. The optical panel 55 comprises a plurality of light transmitting holes 58 installed around a periphery of the optical panel 55. The detecting device 56 is used for detecting the rotations of the optical panel 55. It comprises a chassis 60, a light source 62 installed at one side of the optical panel 55 on the chassis 60, and a light detector 64 installed at another side of the optical panel 55 on the chassis 60. The light detector 64 comprises four sequentially arranged optic sensors 66a, 66b, 66c, 66d separately installed for detecting light passing through the light transmitting holes 58 and generating different detecting signals, and two comparators 72, 74 for comparing the detecting signals generated by the optic sensors 66a, 66b, 66c, 66d to generate a displacement signal. The comparator 72 is used for comparing the detecting signals generated by the sensors 66a and 66c. The comparator 74 is used for comparing the detecting signals generated by the sensors 66b and 66d. If the sensors 66a, 66b, 66c, 66d and the comparators 72, 74 are arranged onto a single chip, they will have a more matched performance because they would be developed under the same semiconductor processing circumstances. The size and the position of each light transmitting hole 58 on the optical panel 55 are carefully arranged such that at any given time, two adjacent optic sensors at the most may receive light through the light transmitting hole 58. Such a design makes it easier or the comparators 72, 74 to compare the detecting signals because the intensity of each detecting signal can be clearly identified.

Figure 8:
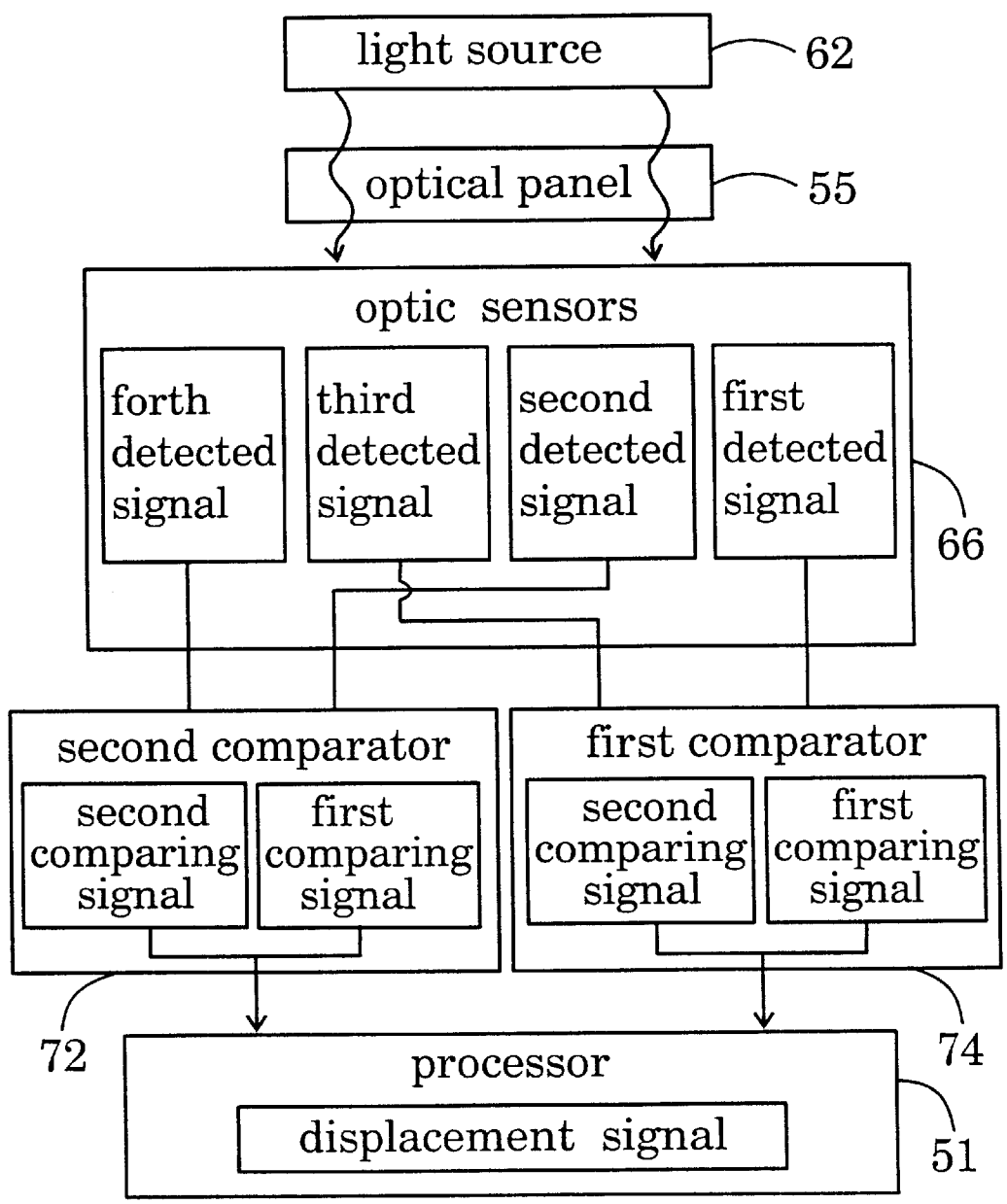
FIG. 8 is a block diagram of the optical sensing device in FIG. 5.

Please refer to FIG. 8. FIG. 8 is a function block diagram of the optical sensing device 52. When the handle 46 at the top section of the control stick 44 is moved, the driving mechanism 50 at the bottom section of the control stick 44 will rotate the optical panel 55 so as to move the light transmitting holes 58 on it. At the same time, the light emitted from the light source 62 will pass through the moveable light transmitting holes 58 to the optic sensors 66a, 66b, 66c, and 66d on the light detector 64 in succession so that each of the optic sensors 66a, 66b, 66c, and 66d will generate a corresponding detecting signal, and the detecting signal will be passed on to the corresponding comparator 72 or 74. Once the comparator 72 receives the detecting signals from the sensors 66a and 66c, it will compare the detecting signals and generate a digital signal. If the detecting signal generated by the sensor 66a is greater than that generated by the sensor 66c, a logic high "1" will be generated. Otherwise, a logic low "0" will be generated. In the same manner, the comparator 74 will generate a logic high "1" when the detecting signal generated by the sensor 66b is greater than that generated by the sensor 66d, and will otherwise generate a logic low "0." Therefore, when the light emitted by the light source 62 is passed to the optic sensors in the sequence of 66a, 66b, 66c, 66d, four combinations of digital signals in the sequence of (1,1), (0,1), (0,0), and (1,0) will be outputted to the processor 51, and the movement direction and the speed of the control stick 44 in a specific axial direction can be determined according to the generated sequence and the rate of generating each pair of the digital signals. Because the computer joystick 40 comprises two optical sensing devices 52 for detecting its movement in two perpendicular directions, the displacement of the control stick 44 can be accurately identified.

Compared with the prior art computer joystick which converts analog signals into digital signals through the use of upper and lower limit voltages, the computer joystick 40 uses paired optic sensors 66a/c and 66b/d to generate different pairs of detecting signals, and uses comparators 72, 74 to compare the detecting signals and to generate the two comparison signals which are then used to generate a displacement signal for representing the movement of the computer joystick 40. Because the comparators 72, 74 generate a pair of digital comparison signals whenever the handle 46 is slightly moved, the time for responding to a joystick movement can be reduced to as short as 15 $\mu$s therefore making the computer joystick 40 a very sensitive and responsive device which will prevent the optical sensing device 52 from missing any count.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A computer joystick comprising:

a housing having an opening on its top;

a control stick comprising a handle installed at its top section, a ball-shaped portion at its middle section rotatably installed inside the opening of the housing, and a driving mechanism installed at its bottom section; and two optical sensing devices for detecting movements of the driving mechanism of the control stick in two perpendicular directions and generating corresponding displacement signals, each optical sensing device comprising:

an optical panel comprising a plurality of light transmitting holes installed on it;

a light source installed at one side of the optical panel;

a plurality of sequentially arranged optic sensors installed at another side of the optical panel for detecting light transmitted from the light source through the light transmitting holes of the optical panel and generating correspondent detecting signals; and a plurality of comparators for comparing the detecting signals to generate the displacement signals;

wherein when the handle at the top section of the control stick is moved, the driving mechanism at the bottom section of the control stick will rotate the optical panel so as to move the light transmitting holes on it, and the comparators will then compare the detecting signals generated by the optic sensors when the light transmitting holes are moved so as to generate the corresponding displacement signals.

2. The computer joystick of claim 1 wherein each of the optical sensing devices comprises four optic sensors for generating first, second, third and fourth detecting signals, the four optic sensors being arranged along the moving direction of the light transmitting holes of the optical panel such that the movement of the optical panel causes the light transmitting holes of the optical panel to pass the four optic sensors sequentially so as to generate the four detecting signals sequentially, wherein a first comparator of the two comparators will compare the first and third detecting signals to generate a first comparison signal, and a second comparator of the two comparators will compare the second and fourth detecting signals to generate a second comparison signal over which the first and second comparison signals form the displacement signals.

3. The computer joystick of claim 2 wherein when the first detecting signal is greater than the third detecting signal or when the second detecting signal is greater than the fourth detecting signal, the corresponding comparator will generate a logic high signal, and when the first detecting signal is smaller than the third detecting signal or when the second detecting signal is smaller than the fourth detecting signal, the corresponding comparator will generate a logic low signal.

4. The computer joystick of claim 2 further comprising a processor for generating the displacement signals according to the two comparison signals generated by the two comparators.

5. The computer joystick of claim 1 wherein the optical panel is a circular panel, and each optical sensing device further comprises an axle installed at a center of the optical panel, the light transmitting holes of the optical panel being installed around the periphery of the optical panel, and the driving mechanism at the bottom section of the control stick comprising a semi-spherical surface for engaging the axle of the optical panel so as to rotate the light transmitting holes on the optical panel.

* * * * *